(12) United States Patent
Papasakellariou et al.

(10) Patent No.: US 8,811,313 B2
(45) Date of Patent: Aug. 19, 2014

(54) APPARATUS AND METHOD FOR ENABLING LOW LATENCY TRANSMISSIONS IN THE UPLINK OF A COMMUNICATION SYSTEM

(75) Inventors: Aris Papasakellariou, Houston, TX (US); Gert-Jan Van Lieshout, Middlesex (GB); Soeng-Hun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 275 days.

(21) Appl. No.: 13/004,413

(22) Filed: Jan. 11, 2011

(65) Prior Publication Data

US 2011/0171985 A1 Jul. 14, 2011

Related U.S. Application Data

(60) Provisional application No. 61/293,855, filed on Jan. 11, 2010.

(51) Int. Cl.
*H04W 4/00* (2009.01)
(52) U.S. Cl.
USPC .......................................................... 370/329
(58) Field of Classification Search
CPC ..... H04W 72/04; H04W 88/08; H04W 76/00; H04W 84/18; H04W 84/12; H04W 80/04; H04W 88/06; H04W 72/0453; H04W 72/0446; H04L 47/10; H04L 47/30; H04L 47/11; H04L 47/12; H04L 47/15; H04L 47/70; H04L 47/35
USPC ......... 370/230, 229, 235, 310, 329, 328, 330, 370/344, 431; 455/452.1
See application file for complete search history.

(56) References Cited

U.S. PATENT DOCUMENTS

| | | | |
|---|---|---|---|
| 8,385,264 B2 * | 2/2013 | Baldemair et al. | 370/328 |
| 2009/0239590 A1 | 9/2009 | Parkvall | |
| 2009/0257408 A1 * | 10/2009 | Zhang et al. | 370/336 |
| 2009/0268693 A1 | 10/2009 | Lindh et al. | |
| 2009/0274077 A1 | 11/2009 | Meylan et al. | |
| 2010/0151874 A1 * | 6/2010 | Cai et al. | 455/452.1 |
| 2010/0254329 A1 * | 10/2010 | Pan et al. | 370/329 |
| 2011/0014911 A1 * | 1/2011 | Baldemair et al. | 455/434 |
| 2011/0039568 A1 * | 2/2011 | Zhang et al. | 455/452.1 |
| 2011/0070845 A1 * | 3/2011 | Chen et al. | 455/91 |
| 2011/0110357 A1 * | 5/2011 | Chung et al. | 370/344 |
| 2012/0163305 A1 * | 6/2012 | Nimbalker et al. | 370/329 |
| 2012/0170541 A1 * | 7/2012 | Love et al. | 370/329 |
| 2012/0236816 A1 * | 9/2012 | Park et al. | 370/329 |

FOREIGN PATENT DOCUMENTS

EP 2 141 935 1/2010

\* cited by examiner

*Primary Examiner* — Abdullah Riyami
(74) *Attorney, Agent, or Firm* — The Farrelll Law Firm, P.C.

(57) ABSTRACT

Methods and apparatus are provided for a User Equipment (UE) to transmit signals in response to the reception of a Downlink Control Information (DCI) format transmitted from a base station of a communication system. The DCI format may provide only the frequency resources for the transmission of signals by the UE, while other parameters associated with the transmission of signals by the UE may be either predetermined or known to the UE through other signaling from the base station. The frequency resources used for the transmission of signals by the UE may be a sub-set of the frequency resources indicated by the DCI format and the determination of this sub-set by the UE may be either deterministic or pseudo-random.

12 Claims, 11 Drawing Sheets

APPARATUS AND METHOD FOR ENABLING LOW LATENCY TRANSMISSIONS IN THE UPLINK OF A COMMUNICATION SYSTEM

PRIORITY

This application claims priority under 35 U.S.C. §119(e) to U.S. Provisional Application No. 61/293,855, entitled "Enabling Low Latency of Transmission in the Uplink of a Communication System", which was filed on Jan. 11, 2010, the contents of which are incorporated herein by reference.

BACKGROUND OF THE INVENTION

1. Field of the Invention

The present invention is directed to wireless communication systems and, more particularly, to enabling on-demand transmissions of data signals in the uplink of a communication system without explicit respective scheduling assignments.

2. Description of the Art

A communication system consists of the DownLink (DL), conveying transmissions of signals from a base station (NodeB) to User Equipments (UEs), and of the UpLink (UL), conveying transmissions of signals from UEs to the NodeB. A UE, also commonly referred to as a terminal or a mobile station, may be fixed or mobile and may be a wireless device, a cellular phone, a personal computer device, etc. A NodeB is generally a fixed station and may also be referred to as a Base Transceiver System (BTS), an access point, or some other terminology.

The DL supports the transmission of data signals carrying the information content, control signals providing information associated with the transmission of data signals, and Reference Signals (RSs) which are also known as pilot signals. The UL also supports the transmission of data signals, control signals, and RSs.

DL data signals are conveyed through a Physical Downlink Shared CHannel (PDSCH). UL data signals are conveyed through a Physical Uplink Shared CHannel (PUSCH). DL control channels may be of broadcast or UE-specific nature. Broadcast control channels convey system information to all UEs and, depending on their transmission rate, include a Primary Broadcast CHannel (P-BCH), which conveys the Master Information Block (MIB), and Secondary Broadcast CHannels (S-BCH), which convey Secondary Information Blocks (SIBs). The SIBs are further distinguished into SIB1 and SIB-x, x>1. UE-specific control channels can be used to provide Scheduling Assignments (SAs) for PDSCH reception (DL SAs) or PUSCH transmission (UL SAs), as well as for other purposes. The SAs are transmitted from the NodeB to respective UEs using Downlink Control Information (DCI) formats through respective Physical Downlink Control CHannels (PDCCHs). In the absence of PUSCH transmissions, a UE conveys Uplink Control Information (UCI) through a Physical Uplink Control CHannel (PUCCH), otherwise, the UE may convey UCI together with data information through the PUSCH.

In addition to providing DL SAs or UL SAs, DCI formats may provide common DCI for multiple UEs including:

a) Transmission Power Control (TPC) commands for PUSCH or PUCCH transmissions.

b) Scheduling information for a response to Random Access CHannels (RACH) from UEs (RACH response).

c) Scheduling information for a Paging CHannel (PCH).

d) Scheduling System Information (SI) for SIB1 transmissions. An SIB-x, x>1, transmission is scheduled through SIB1 while the MIB transmission always occurs at a predetermined time and frequency position.

DCI formats providing common DCI for multiple UEs are transmitted in PDCCH resources monitored by all UEs. DCI formats providing UE-specific DCI are transmitted in UE-specific PDCCH resources.

Figure 1:
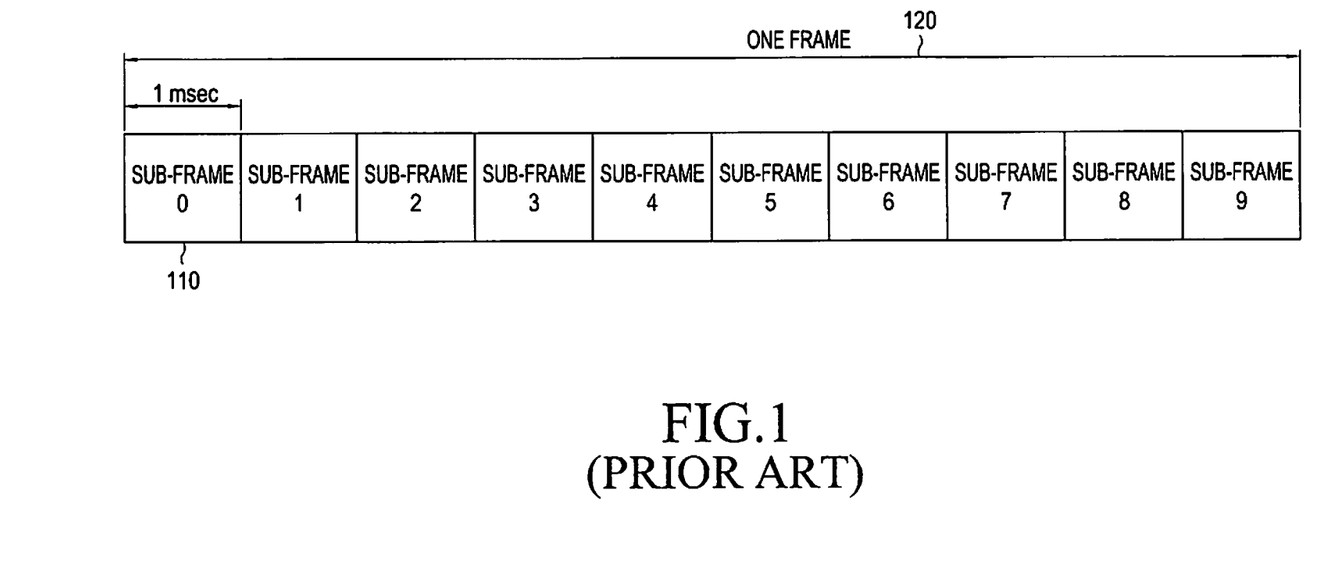
FIG. 1 illustrates a frame structure consisting of ten sub-frames.

The DL or UL Transmission Time Interval (TTI) is assumed to be one sub-frame, and 10 sub-frames constitute one frame as illustrated in FIG. 1. One sub-frame has duration of 1 millisecond (1 msec) 110 and one frame has duration of 10 msec 120. It is further assumed that the MIB transmission in the P-BCH is in sub-frame 0, the SIB1 transmission in the S-BCH is in sub-frame 5, and PCH transmissions may be in sub-frames 0, 4, 5 and 9.

Figure 2:
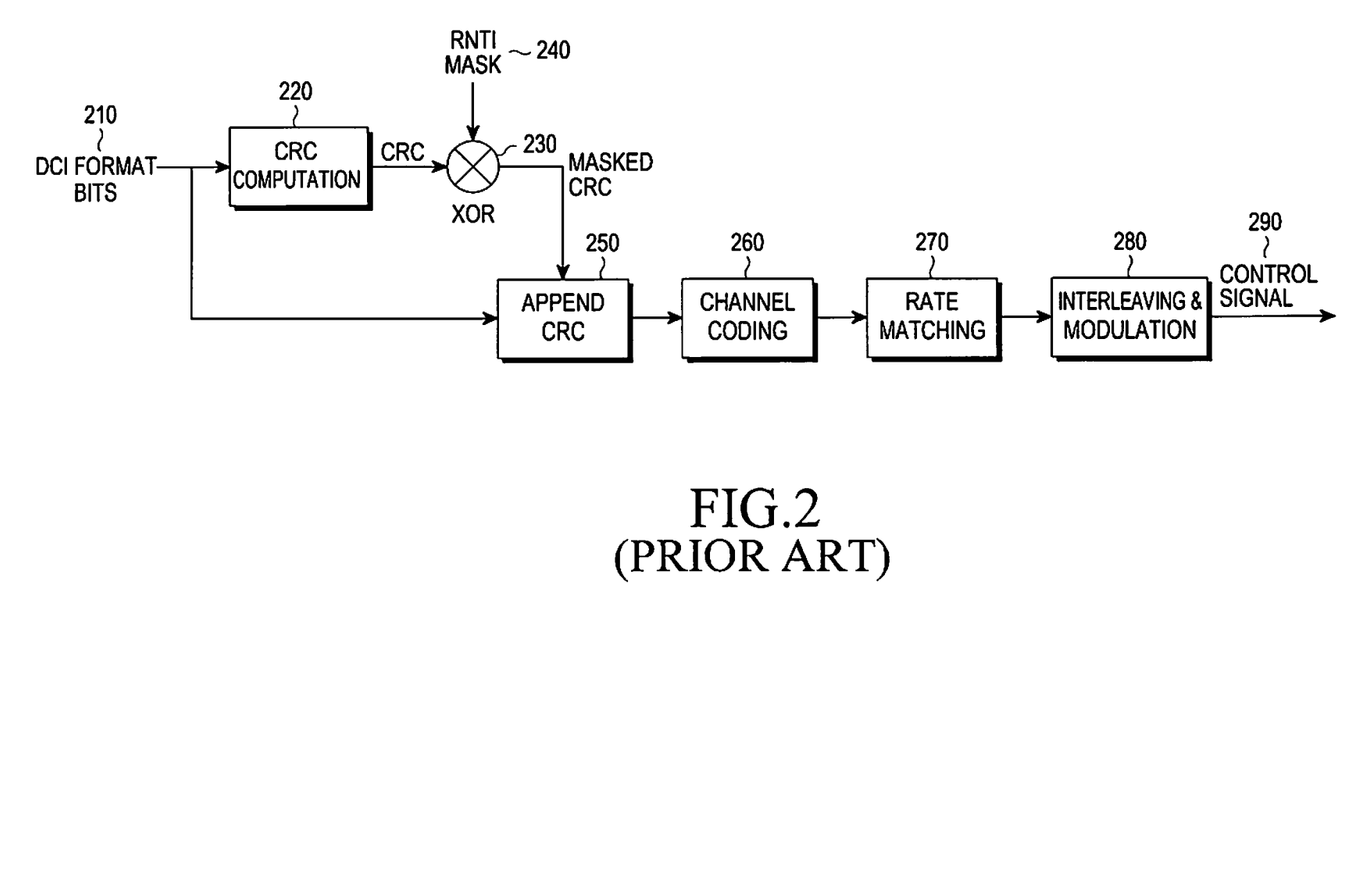
FIG. 2 is a block diagram illustrating the coding and transmission of a DCI format.

FIG. 2 illustrates the coding and transmission of a DCI format by the NodeB. A CRC of (non-coded) DCI format bits 210 is first computed in block 220 and it is then masked with Radio Network Temporary Identifier (RNTI) bits 240 using an exclusive OR (XOR) operation 0 in block 230. The CRC and the RNTI are assumed to have the same size such as, for example, 16 bits. It is XOR(0,0)=0, XOR(0,1)=1, XOR(1,0)=1, XOR(1,1)=0. The masked CRC is appended to the information bits of a DCI format in block 250, channel coding, such as convolutional coding, is performed in block 260, followed by rate matching to the allocated PDCCH resources in block 270, and finally by interleaving, modulation, and transmission of control signal 290 in block 280.

If the DCI format conveys a DL SA or an UL SA, the RNTI is a Cell-RNTI (C-RNTI). DCI formats 3/3A use the TPC-RNTI, and DCI format 1C uses the RA-RNTI for the RACH response, the P-RNTI for the PCH, and the SI-RNTI for SIB1. Then, after descrambling with the respective RNTI, a UE can determine whether a DCI format is intended for it by performing a CRC check.

Figure 3:
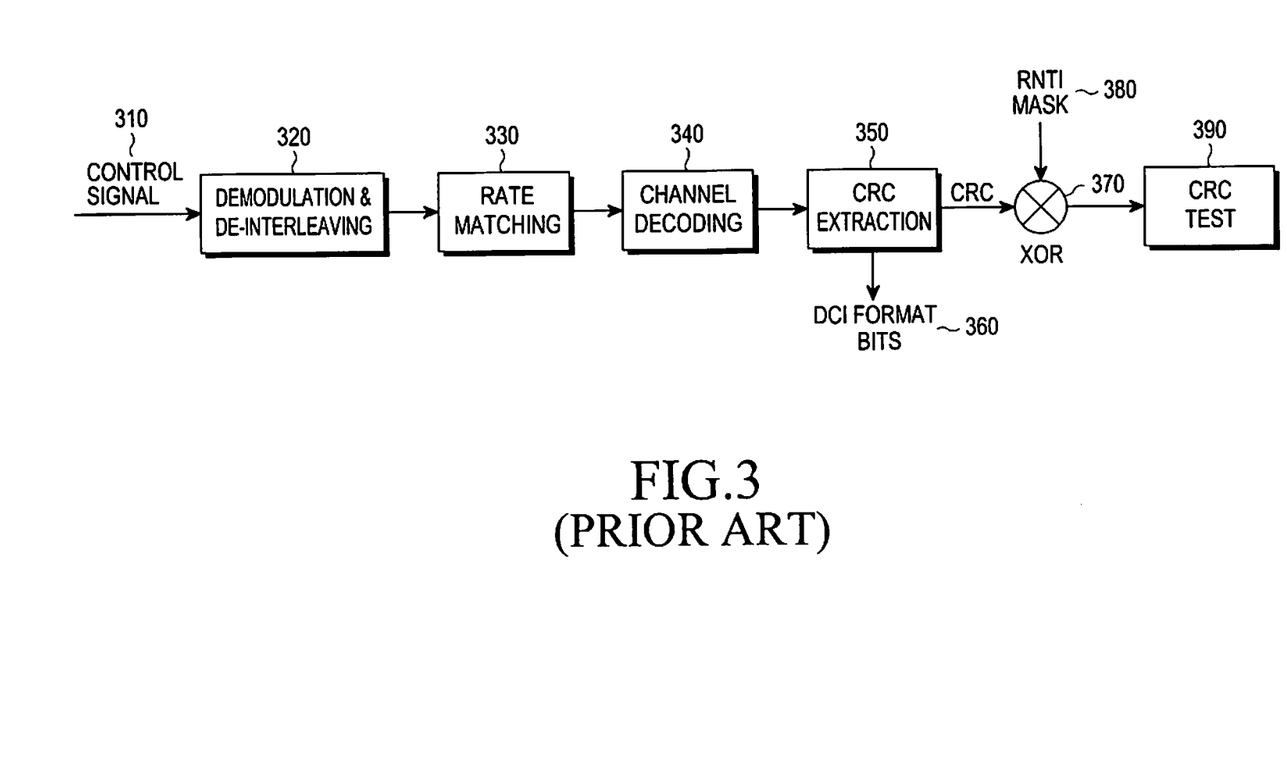
FIG. 3 is a block diagram illustrating the reception and decoding of a DCI format.

The UE receiver performs the reverse operations of the NodeB transmitter to determine whether the UE has an assigned DCI format. This is illustrated in FIG. 3. A received control signal 310 corresponding to a candidate DCI format is demodulated, and the resulting bits are de-interleaved in, block 320. The rate matching applied at the NodeB transmitter is restored in block 330, and the bits are decoded in block 340. After decoding, DCI format bits 360 are obtained after extracting CRC bits in block 350, which are then de-masked at 370 by applying the XOR operation with assumed RNTI 380. Finally, the UE performs a CRC test in block 390. If the CRC test passes, the UE considers the DCI format as a valid one and may further act depending on DCI format information and the type of its RNTI. If the CRC test does not pass, the UE disregards the presumed DCI format.

Figure 4:
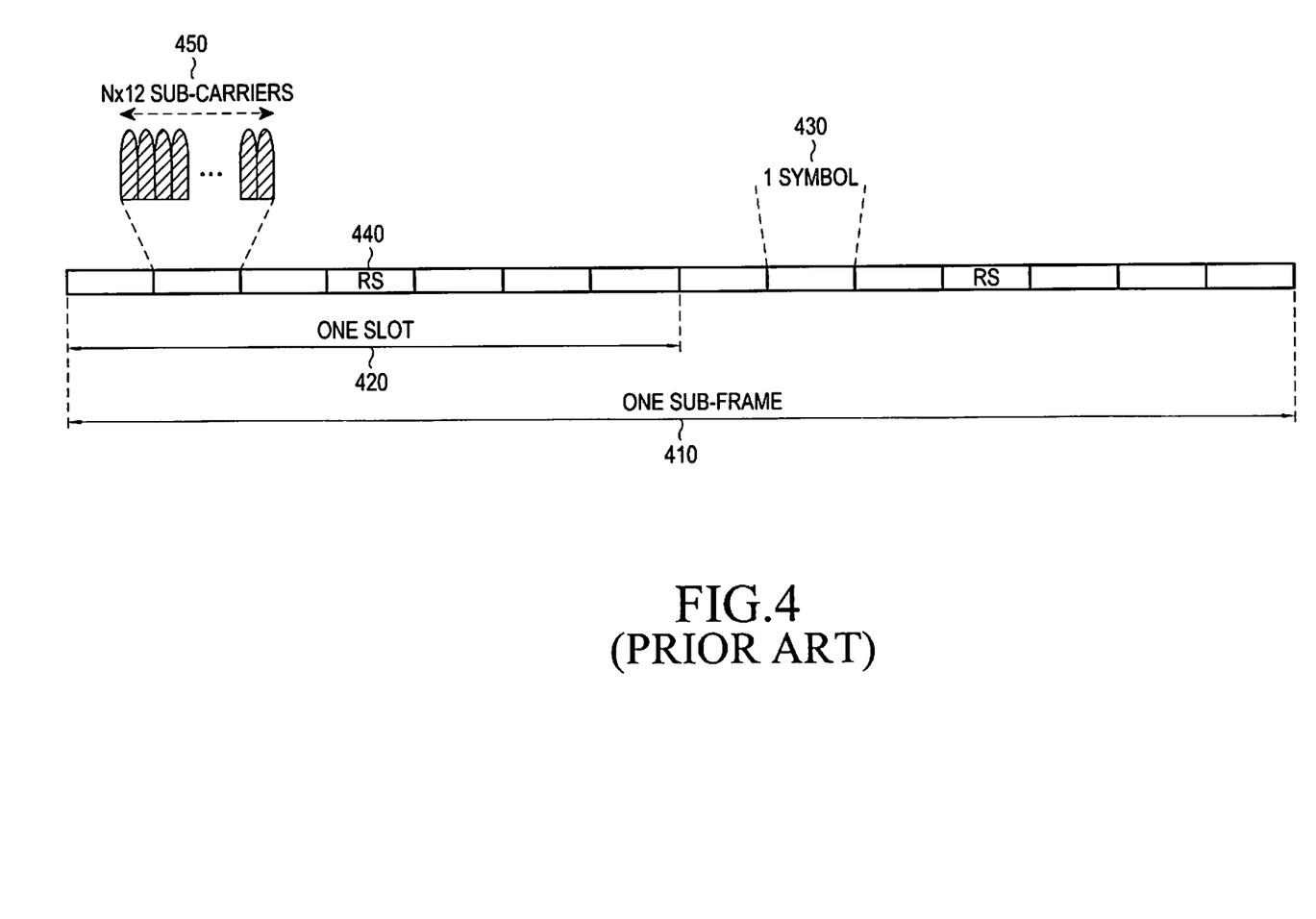
FIG. 4 is a diagram illustrating a PUSCH sub-frame structure.

A PUSCH sub-frame structure is shown in FIG. 4. A sub-frame 410 includes two slots. Each slot 420 includes seven symbols used for the transmission of data and/or control information. Each symbol 430 further includes a Cyclic Prefix (CP) in order to mitigate interference due to channel propagation effects. The PUSCH transmission in one slot may be in the same part or at a different part of the operating BandWidth (BW) than in the other slot and this will be referred to as Frequency Hopping (FH). Some symbols in each slot may be used for RS transmission 440 in order to provide channel estimation and enable coherent demodulation of the received data or control signal. The transmission BW is assumed to include frequency resource units, which will be referred to herein as Resource Blocks (RBs). Each RB is assumed to consist of $N_{sc}^{RR}=12$ sub-carriers, also referred to as Resource Elements (REs). UEs are allocated one or more (consecutive or non-consecutive) RBs 450 for PUSCH transmission.

Figure 5:
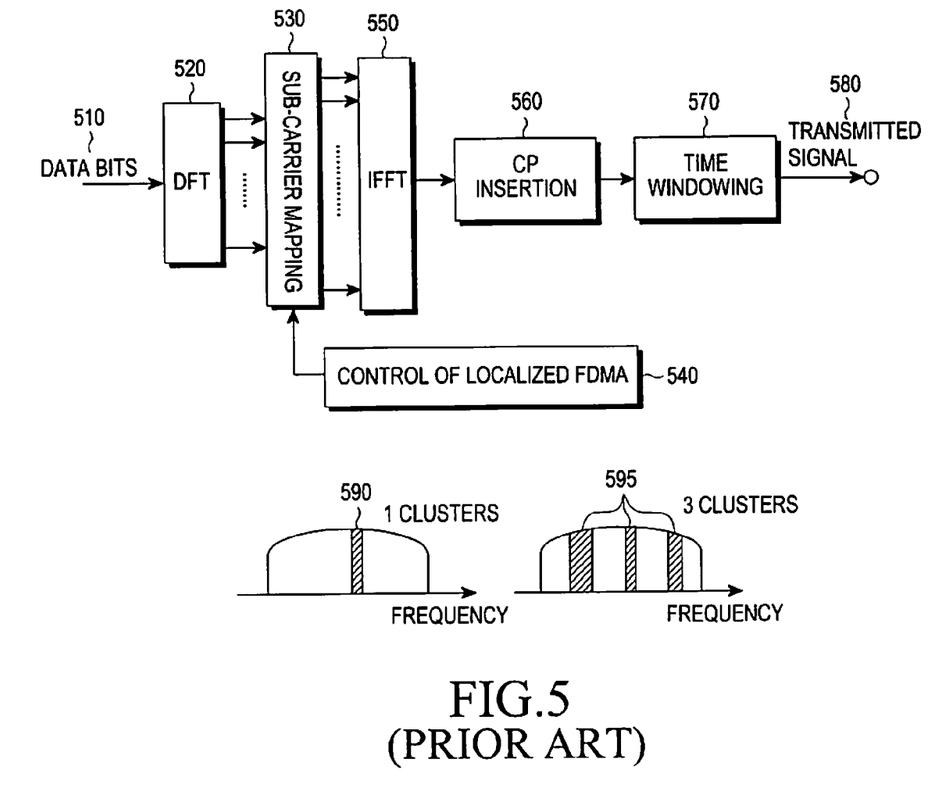
FIG. 5 is a block diagram illustrating a UE transmitter for the PUSCH.

FIG. 5 illustrates a UE transmitter block diagram for the PUSCH. Coded data bits 510 are provided to a Discrete Fourier Transform (DFT) block 520, the REs corresponding to the assigned transmission BW are selected through subcarrier mapping in block 530 through control of localized FDMA 540. The Inverse Fast Fourier Transform (IFFT) is performed in block 550 and a CP is inserted in block 560 and filtering through time windowing is applied in block 570 for a transmitted signal 580. For brevity, additional transmitter circuitry such as a digital-to-analog converter, analog filters, amplifiers, and transmitter antennas are not illustrated. Also, the encoding and modulation process for the data bits are omitted for brevity. The PUSCH signal transmission is assumed to be over clusters of contiguous REs in accordance with the DFT Spread Orthogonal Division Frequency Multiple Access (DFT-S-OFDMA) method, allowing signal transmission over one cluster 590 (also known as Single-Carrier Frequency Division Multiple Access (SC-FDMA)), or over multiple non-contiguous clusters of contiguous BW as shown by 595.

Figure 6:
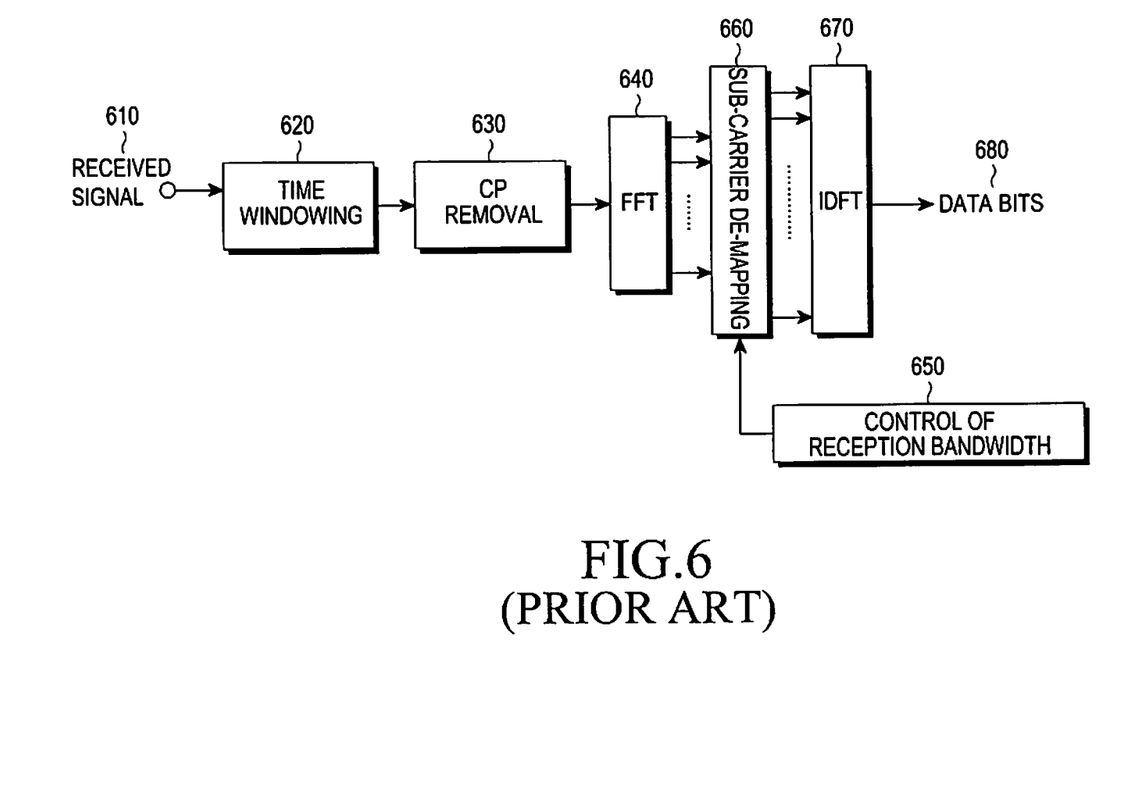
FIG. 6 is a block diagram illustrating a NodeB receiver for the PUSCH.

FIG. 6 illustrates a NodeB receiver block diagram for the PUSCH. After an antenna receives a Radio-Frequency (RF) analog signal and after further processing units (such as filters, amplifiers, frequency down-converters, and analog-to-digital converters), which are not shown for brevity, a digital signal 610 is filtered through time windowing in block 620 and the CP is removed in block 630. Subsequently, the NodeB receiver applies a Fast Fourier Transform (FFT) in block 640, selects the REs used by the UE transmitter through subcarrier mapping in block 660 under control of reception bandwidth in block 650. An Inverse DFT (IDFT) is applied in block 670, and modulated and coded data bits 680 are obtained. As for the UE transmitter, well known NodeB receiver functionalities such as channel estimation, demodulation, and decoding are not shown for brevity.

One of several possible DCI formats is referred to as DCI format 0, which is described in Table 1 through a set of Information Elements (IEs) for operating BWs of $N_{RR}^{UL}$=6/25/50/100 RBs. Additional IEs or different number of bits per IE than those in Table 1 may apply. Zero padding may be included in DCI format 0, if needed, in order to make its size equal to the size of a DL SA DCI format (DCI format 1A). DCI format 1A may be used for scheduling transmissions of PCH, RACH response, or SIB.

RBs, the number of possible contiguous RB allocations is $1+2+\ldots+N_{RB}^{UL}=N_{RB}^{UL}(N_{RB}^{UL}+1)/2$ and can be signaled with $\lceil \log_2 N_{RD}^{UL}(N_{RD}^{UL}|1)/2) \rceil$ bits; where $\lceil \ \rceil$ denotes the ceiling operation which rounds a number to its next higher integer.

The third IE provides a Modulation and Coding Scheme (MCS). For example, the modulation may be QPSK, QAM16, or QAM64, while the coding rate may take discrete values between 1/16 and 1.

The fourth IE is the New Data Indicator (NDI). If the NDI IE is set to 1, a new Transport Block (TB) is transmitted. If the NDI IE is set to 0 the same TB is transmitted as in a previous transmission (synchronous HARQ is assumed for PUSCH transmissions).

The fifth IE provides a Transmit Power Control (TPC) command for PUSCH transmission power adjustments.

The sixth IE provides a Cyclic Shift (CS) Indicator (CSI), which indicates the CS for a Constant Amplitude Zero Auto-Correlation (CAZAC) sequence used for RS transmission.

The seventh IE indicates whether frequency hopping applies to the PUSCH transmission.

The eighth IE indicates whether the UE should include a DL Channel Quality Indication (CQI) report in the PUSCH.

The ninth IE indicates whether the PUSCH transmission is over a contiguous or non-contiguous BW. The RA IE needs to be re-interpreted in the latter case, but the specifics are not material to the invention and are omitted for brevity.

DCI format 1C is described in Table 2 through a set of IEs for a DL operating BW of $N_{RR}^{DL}$=6/25/50/100 RBs.

TABLE 2

DCI Format 1C IEs for Scheduling PCH,
RACH Response, or SIB1 Transmissions.

| Information Element | Number of Bits | Comment |
| --- | --- | --- |
| RB Gap | 0/0/1/1 | Gap Configuration |
| Resource Allocation | 3/7/7/9 | Restricted Assignment of DL RBs |
| MCS | 5 | Up to 32 MCS Levels |
| CRC (RNTI) | 16 | RNTI for RA or SI or PI masks the CRC |
| TOTAL | 24/28/29/31 | |

TABLE 1

IEs for DCI Format 0 for BW of 6/25/50/100 RBs.

| Information Element | Number of Bits | Comment |
| --- | --- | --- |
| DCI Format Indication Flag | 1 | Indicate Format 0 or Format 1A |
| Resource Allocation (RA) | 5/9/11/13 | For Consecutive RBs |
| Modulation-Coding Scheme (MCS) | 5 | Up to 32 MCS Levels |
| New Data Indicator (NDI) | 1 | New TB transmission (Yes/No) |
| Transmission Power Control (TPC) | 2 | Transmission power control command |
| Cyclic Shift Indicator (CSI) | 3 | CSI for RS transmission |
| Frequency Hopping (FH) | 1 | Frequency Hopping (Yes/No) |
| CQI Request | 1 | Include CQI in PUSCH (Yes/No) |
| Resource Allocation Type | 1 | Contiguous or Non-contiguous |
| Zero Padding | 1/1/1/0 | DCI format 0 = DCI format 1A |
| CRC (C-RNTI) | 16 | C-RNTI masks the CRC |
| TOTAL | 37/41/43/44 | |

The first IE provides flag differentiating between DCI Format 0 and DCI Format 1A, which are designed to have the same size.

The second IE provides Resource Allocation (RA) in RBs assuming contiguous transmission BW. For a total of $N_{RR}^{UL}$ The first IE indicates the gap value $N_{gap}$ with $N_{gap}=N_{gap,1}$ or $N_{gap}=N_{gap,2}$. $N_{gap,1}$ and $N_{gap,2}$ are integer values that depend on the system BW and, for brevity, they are not further described as they are not relevant to the invention. It is assumed that for $N_{RR}^{DL}$<50 RBs, it is always $N_{gap}=N_{gap,1}$ and the RB Gap IE is only used for $N_{RR}^{DL}$≥50 RBs.

The second IE provides the resource allocation for PDSCH RBs using $\lceil \log_2(\lfloor N_{VRB,gap1}^{DL}/N_{RB}^{step}\rfloor \cdot (\lfloor N_{VB,gap2}^{DL}/N_{RB}^{step}\rfloor +1)/2)\rceil$ a) $N_{RB}^{step}=2$ for $6 \le N_{RB}^{DL} <50$ and $N_{RB}^{step}=4$ for $50 \le N_{RB}^{DL} \le 110$ and b) $N_{VRB,gap1}^{DL}=2 \cdot \min(N_{gap}, N_{RR}^{DL}-N_{gap})$ for $N_{gap}=N_{gap,1}$ and $N_{VRR,gap2}^{DL}=\lfloor N_{RB}^{DL}/2N_{gap}\rfloor \cdot 2N_{gap}$ for $N_{gap}=N_{gap,2}$.

Because $N_{VRD,gap2}^{DL} \ge N_{VRD,gap2}^{DL}$, the number of RA bits are reserved assuming $N_{VRB,gap1}^{DL}$. The RA specifies:

a) the starting RB, $RB_{start}$, in steps of $N_{RB}^{step}$ RBs, with $RB_{start}=0, N_{RB}^{step}, 2N_{RB}^{step}, \ldots, (\lfloor N_{VRB}^{DL}/N_{RB}^{step}\rfloor -1)N_{RB}^{step}$, and b) the length, $L_{CRB}$, in virtually contiguous RBs, with $L_{CRDs}=N_{RB}^{step}, 2N_{RB}^{step}, \ldots, \lfloor N_{VRB}^{DL}/N_{RB}^{step}\rfloor N_{RB}^{step}$.

An important metric for communication quality that a UE experiences is user plane latency (also known as transport delay), which is defined as the one-way transit time between a Service Data Unit (SDU) packet being available at the Internet Protocol (IP) layer at the UE (or NodeB) and the availability of this packet (Protocol Data Unit, or PDU) at IP layer at the NodeB (or UE). User plane packet delay includes a delay introduced by associated protocols and control signaling for a UE that has synchronized with the NodeB and is in the active state. Advanced communication systems aim to achieve user plane latency less than 10 msec in unloaded conditions (single UE with a single data stream) for small IP packets.

A UL synchronized UE can request a PUSCH transmission by sending a Scheduling Request (SR) on the PUCCH. As the SR transmission is over 1 sub-frame, the shortest SR transmission period is 1 sub-frame. However, to avoid unnecessary SR transmissions, the shortest SR transmission period may also depend on the time period from a time a UE initiates an SR transmission until a time the UE receives an UL SA, at which point the UE knows that the SR was received by the NodeB. The end-to-end process consists of the following steps:

a) UE transmits a SR over 1 sub-frame (1 msec); and
b) NodeB receives the SR, generates and transmits an UL SA, and the UE receives and decodes the UL SA (4 msec).

Assuming that the shortest possible SR transmission period to avoid multiple SR transmissions for the same purpose is 5 msec, the user plane latency is 11.5 msec since the following delays should be included in addition to the previous delays:

a) Average delay to next SR transmission opportunity—2.5 msec (for SR transmission period of 5 msec);
b) UE processing delay of UL SA—if the UL SA is received in sub-frame n, PUSCH transmission is in sub-frame n+4, giving 3 msec for UE processing time; and
c) PUSCH transmission from UE over 1 sub-frame—(1 msec).

Table 3 summarizes the previously described delays.

TABLE 3

User Plane Latency for SR Transmission Period of 5 msec.

| Description | Delay (msec) |
| --- | --- |
| UE: Average Delay for next SR Opportunity | 2.5 |
| UE: SR Transmission (1 sub-frame) | 1 |
| NodeB: SR Reception, SA generation and transmission (3 sub-frames) | 4 |
| UE: SA reception, PUSCH generation and transmission (4 sub-frames) | 4 |
| TOTAL | 11.5 |

One approach to reduce user plane latency is to reduce the SR transmission period. For example, reducing the SR transmission period to 1 msec would reduce the user plane latency to 9.5 msec. However, as previously mentioned, the shortest SR transmission period until a UE can know whether its SR was correctly received by the NodeB is 5 msec. Also, a shorter SR transmission period, such as 1 msec or 2 msec, increases the PUCCH overhead as a unique SR resource should be assigned to each UE to avoid potential SR collisions. Also, as the SR transmission period is assigned to a UE through Radio Resource Control (RRC) signaling at connection setup, its fast adaptation is not possible. RRC signaling or Medium Access Control (MAC) signaling will be referred to as higher layer signaling to differentiate such signaling from PDCCH signaling which is through the physical layer.

Another approach to reduce user plane latency would be to reduce the UE and NodeB processing delays. However, this is associated with substantially higher implementation cost, which is not desirable.

Another approach to reduce user plane latency is to have Contention-Based (CB) PUSCH transmissions which are generated without prior SR transmission and without a UE-specific UL SA. For CB-PUSCH transmissions, UEs need to be informed by the NodeB of at least a set of available UL RBs. One way to achieve this is through a DCI format with CRC scrambled by a CB-RNTI. A UE needs to know its CB-RNTI in advance and multiple UEs may share the same CB-RNTI. Therefore, collisions may occur as multiple UEs, sharing the same CB-RNTI, may attempt CB-PUSCH transmissions in the same RBs and in the same sub-frame. However, CB-PUSCH transmissions can substantially reduce user plane latency as the delays due to SR transmission by the UE and SR processing and UL SA generation and transmission by the NodeB are avoided. As the NodeB does not know which UE, if any, may have CB-PUSCH transmission, a UE can add its C-RNTI to its MAC PDU. The delay components for CB-PUSCH transmission are summarized in Table 4. Over 50% reduction relative to SR-based PUSCH transmission is achieved (for 5 msec SR transmission period).

TABLE 4

User Plane Latency for SR Transmission Period of 5 msec.

| Description | Delay (msec) |
| --- | --- |
| UE: Average Delay for beginning of next sub-frame | 0.5 |
| UE: PDCCH with CB-RNTI Reception | 5 |
| UE: PUSCH generation and transmission (4 sub-frames) | |
| TOTAL | 5.5 |

Therefore, there is a need to define the IEs for a DCI format supporting CB-PUSCH transmissions for various operating BWs.

There is another need to define methods for assigning RBs to CB-PUSCH transmissions using a DCI format.

Further, there is need to support CB-PUSCH transmissions while minimizing the associated signaling overhead and UE power consumption.

SUMMARY OF THE INVENTION

The present invention has been made to address at least the above problems and/or disadvantages and to provide at least the advantages described below. Accordingly, an aspect of the present invention provides methods and apparatus for a UE to obtain frequency resources for the transmissions of signals in a PUSCH.

According to one aspect of the present invention, the UE receives a DCI format transmitted through a respective PDCCH by a base station which informs the UE of a first set of frequency resources for the transmission of signals in the PUSCH and may be received by all UEs having PDCCH reception. The first set of frequency resources may be smaller than the frequency resources for transmission of signals by UEs. Using the first set of frequency resources the UE determines a second set of frequency resources, which may be the same as the first set of frequency resources, and the other parameters associated with the transmission of signals in the PUSCH are either specified in the operation of the communication system or are informed to the UE by the base station through broadcast signaling or through UE-specific signaling using higher layers.

According to another aspect of the present invention, the UE receives a first DCI format, transmitted through a PDCCH by a base station over an operating bandwidth and having a first RNTI, which informs the UE of a set of frequency resources for the transmission of signals in the PUSCH. The size of the first DCI format is equal to the size of a second DCI format having a second RNTI type if the operating bandwidth is smaller than or equal to a predetermined bandwidth and it is equal to the size of a third DCI format having the third RNTI type if the first operating bandwidth is larger than the predetermined bandwidth.

According to an additional aspect of the present invention, the UE receives a DCI format transmitted through a respective PDCCH by a base station over an operating bandwidth which informs the UE of a set of frequency resources for the transmission of signals in the PUSCH where the set of frequency resources has a first granularity, such as a resource block, if the operating bandwidth is smaller than or equal to a predetermined bandwidth and a second granularity, such as a multiple of the resource block, if the operating bandwidth is larger than the predetermined bandwidth.

According to a further aspect of the present invention, the UE receives a DCI format transmitted through a respective PDCCH by a base station which informs the UE of a set of frequency resources with a first granularity, such as a multiple of a resource block, and selects a second set of frequency resources, which is a sub-set of the first set, with a second granularity such as a resource block, and uses the second set of frequency resources for transmission of signals in the PUSCH. The selection of the second set of frequency resources may be based on predetermined criteria or on a pseudo-random function including the RNTI assigned to the UE by the base station for the reception of a DCI format.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. This invention may be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to a Single-Carrier Frequency Division Multiple Access (SC-FDMA) communication system, it also applies to all Frequency Division Multiplexing (FDM) systems in general and to Orthogonal Frequency Division Multiple Access (OFDMA), OFDM, FDMA, Discrete Fourier Transform (DFT)-spread OFDM, DFT-spread OFDMA, SC-OFDMA, and SC-OFDM in particular.

Embodiments of the present invention consider that a DCI format is used to enable CB-PUSCH transmissions (hereinafter referred to as DCI format 1F) and the only information provided to UEs is the RBs available for CB-PUSCH transmission. The CRC of DCI format 1F is scrambled with a CB-RNTI. The CB-RNTI is either:

a) informed to UEs through UE-specific RRC signaling to provide flexibility for potentially allocating different CB-RNTIs to different UEs, or b) informed to UEs in advance through a SIB, if all UEs share the same CB-RNTIs If multiple CB-RNTIs are broadcasted, a UE may randomly select a CB-RNTI, for example, using a pseudo-random function having the C-RNTI as an input.

Embodiments of the present invention will be described with respect to a UE-specific CB-RNTI but the same design principles directly apply in case of UE-common CB-RNTI.

Referring to the DCI format 0 IEs described in Table 1, the following modifications apply for DCI format 1F:

a) The differentiating flag IE is not needed as the CB-RNTI indicates the type of the DCI format.

b) The RA IE is needed for DCI format 1F and will be subsequently described in detail.

c) The MCS IE is not needed because the NodeB cannot know in advance which UEs will have CB-PUSCH transmission. Instead, the MCS can be fixed or, alternatively, the UE can select from a small set of predetermined MCS, which may also be fixed or broadcasted by the NodeB. Allowing the MCS to be variable may require multiple CB-PUSCH receiver chains at the NodeB, but this extra complexity is only limited to the digital domain and is under the NodeB control by setting the maximum allowed CB-PUSCH transmissions per sub-frame. Additionally, increasing the CB-PUSCH receiver chains by a factor equal to the number of the potential MCS for a CB-PUSCH transmission may be avoided through implementation-specific means. For example, based on the received RS power in the CB-PUSCH, the NodeB may consider MCS only in a sub-set of the set of possible CB-PUSCH MCS.

d) The NDI IE is not needed as a CB-PUSCH transmission is always for a new TB.

e) The TPC IE is not needed because the NodeB cannot know in advance which UEs will attempt CB-PUSCH transmission. Such a UE can choose to use, for example, the same transmission power as for a previous PUSCH transmission.

f) The CSI IE is not needed as the invention considers that Spatial Division Multiple Access (SDMA) does not apply to CB-PUSCH transmissions and therefore there is no need to provide multiple orthogonal RS using respectively multiple CS. A UE with CB-PUSCH transmission can use a CS determined through cell-specific parameters including, for example, a CS value broadcasted by the NodeB. Alternatively, the CS value may be predetermined. The UE may treat the CSI IE as having the zero value.

g) The FH IE is not needed. Embodiments of the present invention consider that the application of FH to CB-PUSCH transmissions is either broadcasted by the NodeB or it is predetermined. For example, if the NodeB considers the UL channel medium to be frequency selective, it may indicate that FH should apply. Alternatively, FH may always apply to provide frequency diversity as frequency domain scheduling of CB-PUSCH transmissions is not possible or the application of FH may depend on the operating BW (FH is used for larger BWs). The use of FH may also be associated with the size of the DCI format 1F, as it is subsequently described.

h) The CQI Request IE is not needed. The CB-PUSCH transmission may be predetermined to never include CQI.

i) The Resource Allocation Type IE, which is meaningful for PUSCH transmissions with more than 1 RB, is not needed as, similar to the FH IE, CB-PUSCH transmission over contiguous or non-contiguous BW can either be informed to a UE through broadcasted or UE-specific RRC signaling by the NodeB or be predetermined.

j) In case of multiple UE transmitter antennas, the UE may only apply transmission diversity methods transparent- to the NodeB, and Spatial Multiplexing (SM) is not used with CB-PUSCH transmissions.

In order for the UE to not increase the number of PDCCH decoding operations it needs to perform per sub-frame, the size of DCI format 1F is chosen to be the same as the size of DCI format 0/1A or the same as the size of DCI format 1C.

If DCI format 1F has the same size as DCI format 0/1A then, based on the above design principles for DCI format 1F and on the description of DCI format 0/1A in Table 1, the IEs for DCI format 1F are described in Table 5.

TABLE 5

IEs in DCI Format 1F for CB-PUSCH Transmissions -
size of 1F = size of 0/1A.

| Information Element | Number of Bits | Comment |
|---|---|---|
| Resource Allocation (RA) | 21/25/27/28 | Available Number of Bits for RA |
| CRC (CB-RNTI) | 16 | CB-RNTI masks the CRC |
| TOTAL | 37/41/43/44 | For 6/25/50/100 RBs, respectively |

If DCI format 1F has the same size as DCI format 1C then, based on the above design principles for DCI format 1F and on the description of DCI format 1C in Table 2, the IEs for DCI format 1F are described in Table 6.

TABLE 6

IEs in DCI Format 1F for CB-PUSCH Transmissions -
size of 1F = size of 1C.

| Information Element | Number of Bits | Comment |
|---|---|---|
| Resource Allocation (RA) | 8/12/13/15 | Available Number of Bits for RA |
| CRC (CB-RNTI) | 16 | CB-RNTI masks the CRC |
| TOTAL | 24/28/29/31 | For 25/50/100 RBs, respectively |

The tradeoff between making the size of DCI format 1F equal to the size of DCI format 0/1A or equal to the size of DCI format 1C is the increased granularity for the RA IE in the former case, as a larger number of bits is available, at the expense of a larger size for DCI format 1F which results to increased overhead and reduced coverage area for the transmission of DCI format 1F with a required reliability.

The requirement for the RA granularity is subsequently described considering that the requirement for reduced user plane latency, and therefore for CB-PUSCH transmissions, is for the transmission of small packets requiring a small number of RBs, such as 1 to 3 RBs, with a relatively low MCS. As it is desirable to minimize the size of the DCI format used for CB-PUSCH transmissions, particularly for small operating BWs, it is first considered that the size of DCI format 1F is equal to the size of DCI format 1C and Table 6 will be used as reference for the size of the RA IE. For simplicity, the DL operating BW is assumed to be the same as the UL operating BW; the embodiments of the invention can be extended in a straightforward manner to the case of the DL operating BW being different than the UL operating BW.

For small operating BWs, each RB can be indicated for CB-PUSCH transmission each RB even when the size of DCI format 1F is equal to the size of DCI format 1C. For example, for $N_{RR}^{UL}$6 RBs, there are 8 bits available for RA and a bitmap of 6 bits can indicate each RB available for CB-PUSCH transmission. The bitmap bits may be, for example, the first 6 bits of the RA IE and the remaining bits can either be set to 0 or be used for other functionalities.

Figure 7:
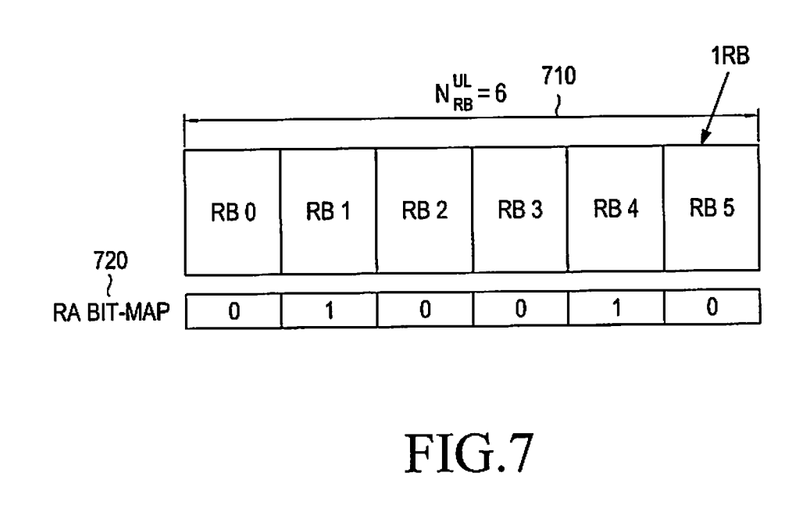
FIG. 7 is a diagram illustrating the indication of each RB in the operating BW for CB-PUSCH transmission, according to an embodiment of the present invention.

FIG. 7 is a diagram illustrating the indication of each RB in the operating BW for CB-PUSCH transmission, according to an embodiment of the present invention. The UL BW consists of $N_{RR}^{UL}$=6 RBs 710 and the bitmap using the first 6 bits of the RA IE 720 indicates (through a bit value of 1) that RB1 and RB4 are available for CB-PUSCH transmissions in the respective UL sub-frame.

For medium operating BWs, the number of RBs becomes larger than the number of RA IE bits. For example, for $N_{RB}^{UL}=25$ RBs, the RA IE has 12 bits. Two methods are considered to address this issue. With the first method, the RBs are assumed to be combined in RB Groups (RBGs) consisting of multiple, consecutive or non-consecutive, RBs. With the second method, only half of the $N_{RR}^{UL}$ RBs are indicated for CB-PUSCH transmission by the RA IE of DCI format 1F and FH is assumed to apply. The NodeB ensures the availability of RBs not indicated by the RA IE in DCI format 1F and used for FH of a CB-PUSCH transmission. These RBs may be symmetric relative to the middle of the operating BW or they may be at the same position in the first and second halves of the operating BW as in 3GPP E-UTRA LTE.

Figure 8:
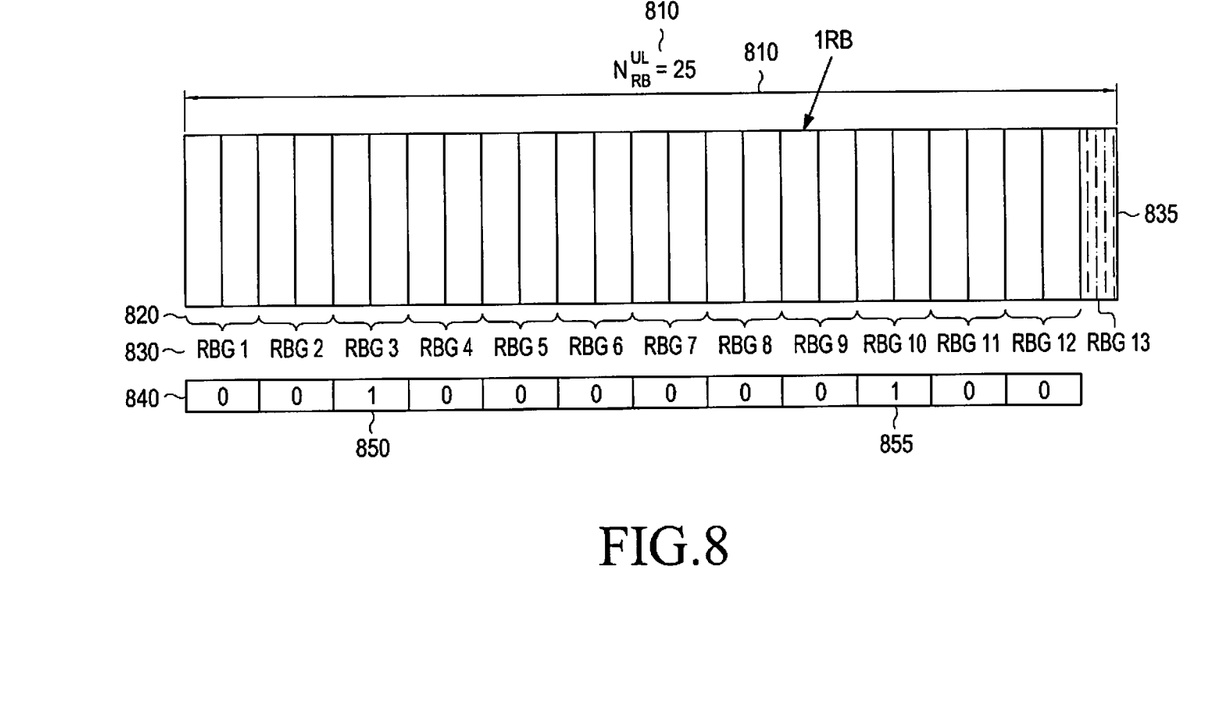
FIG. 8 is a diagram illustrating the indication of each RBG in the operating BW for CB-PUSCH transmission using 2 RBs per RBG, according to an embodiment of the present invention.

FIG. 8 illustrates the first method where an RBG consists of P=2 consecutive RBs, according to an embodiment of the present invention. The total number of RBGs is $N_{RBG}=\lceil N_{RB}^{UL}/P\rceil$ where $\lfloor N_{RB}^{DL}/P\rfloor$ of the RBGs are of size P RBs and, if $N_{RR}^{UL}$ mod P>0, then one of the RBGs is of size $N_{RD}^{UL}-P\cdot\lfloor N_{RD}^{UL}/P\rfloor$ RBs. The bitmap size is $N_{RBG}$ bits with one bitmap bit per RBG so that each RBG is addressable. The RBGs can be indexed in order of increasing frequency with non-increasing RBG sizes starting at the lowest frequency (RBG 0 is mapped to the MSB and RBG $N_{RBG}-1$ is mapped to the LSB of the bitmap). An RBG is allocated to a UE if the respective bit value in the bitmap is 1; otherwise, the RBG is not allocated. For $N_{RB}^{UL}=25$ RBs 810 and P=2 RBs 820, there are $N_{RBG}=\lceil 25/2\rceil=13$ RBGs 830 with the first 12 RBGs consisting of 2 RBs and a last RBG 835 consisting of 1 RB. Since the RA IE of DCI format 1F has 12 bits, the last RBG 835 consisting of 1 RB may not be addressed and may not be used for CB-PUSCH transmissions. In FIG. 8, the RA IE provides a bitmap 840 with 12 bits and indicates RBG3 850 and RBG10 855 for CB-PUSCH transmission.

It is possible for the RA IE in DCI format 1F to exclude RBs at the two ends of the operating BW that are typically used for PUCCH transmissions or other transmissions, such as SPS transmissions, as these RBs may not be available for CB-PUSCH transmissions. This will effectively reduce the number of RBs, or RBGs, the RA IE in DCI format 1F needs to address. Defining a total number of RBs for scheduled PUSCH transmissions as $N_{RR}^{PUSCH}=N_{RR}^{UL}-N_{RR}^{HO}$, where the parameter "PUSCH-HoppingOffset" $N_{RR}^{HO}$ is provided to UEs either by broadcast signaling or through UE-specific RRC signaling, the RA IE in DCI format 1F needs only address $N_{RR}^{PUSCH}$ RBs, instead of $N_{RR}^{UL}$ RBs.

Figure 9:
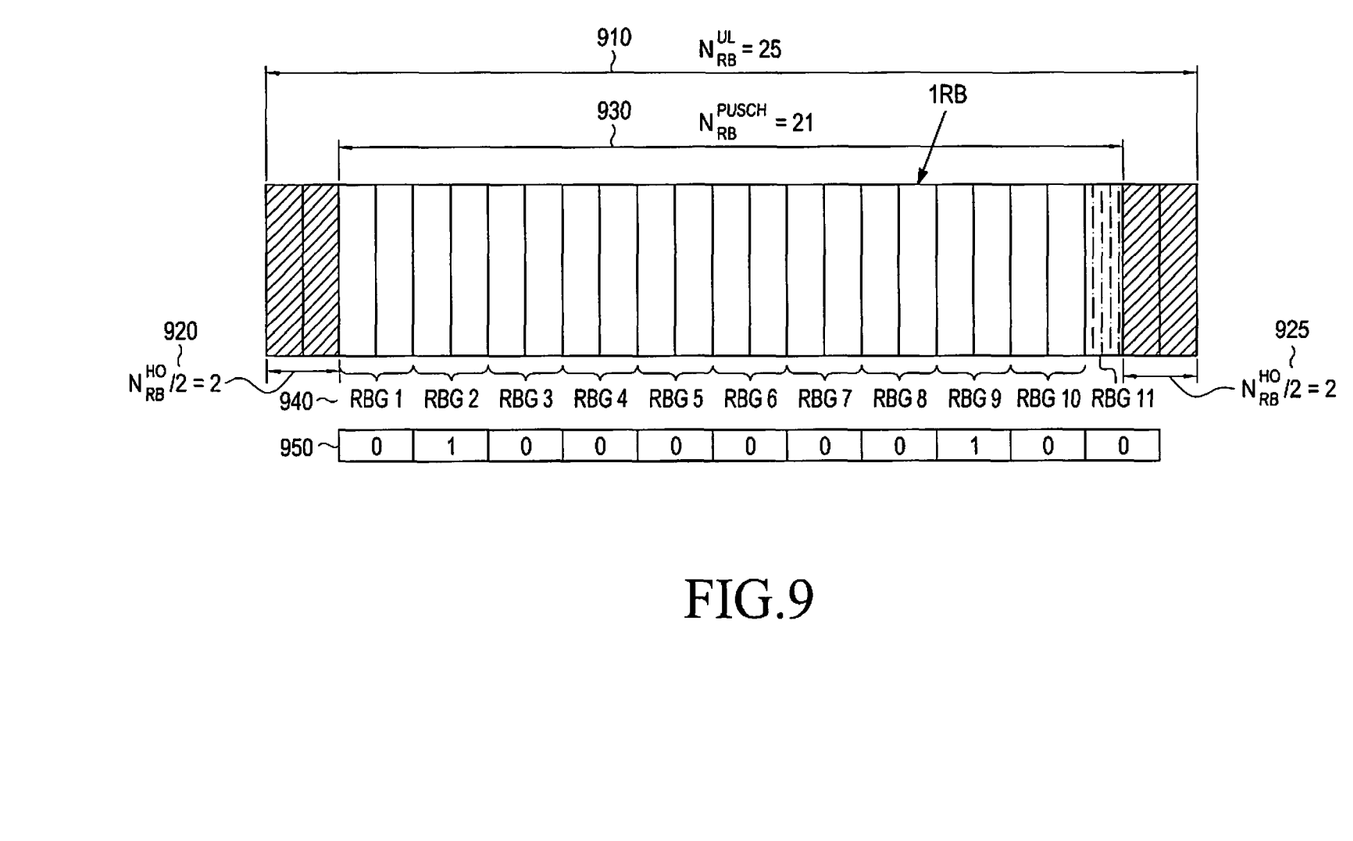
FIG. 9 is a diagram illustrating the indication of each RBG for CB-PUSCH transmission, using 2 RBs per RBG, without addressing RBs at each end of the operating BW, according to an embodiment of the present invention.

FIG. 9 is a diagram illustrating the indication of each RBG for CB-PUSCH transmission, using 2 RBs per RBG, without addressing RBs at each end of the operating BW, according to an embodiment of the present invention. Specifically, FIG. 9 illustrates the above principle where for $N_{RB}^{UL}=25$ RBs 910, P=2 RBs, and $N_{RR}^{HO}=4$ RBs 920, 925, it is $N_{RR}^{PUSCH}=21$ RBs 930, and the 12 bits in the RA IE are sufficient to provide a bitmap with 11 bits 950 to address all $N_{RBG}=\lceil N_{RB}^{PUSCH}/P\rceil=11$ RBGs 940.

Figure 10:
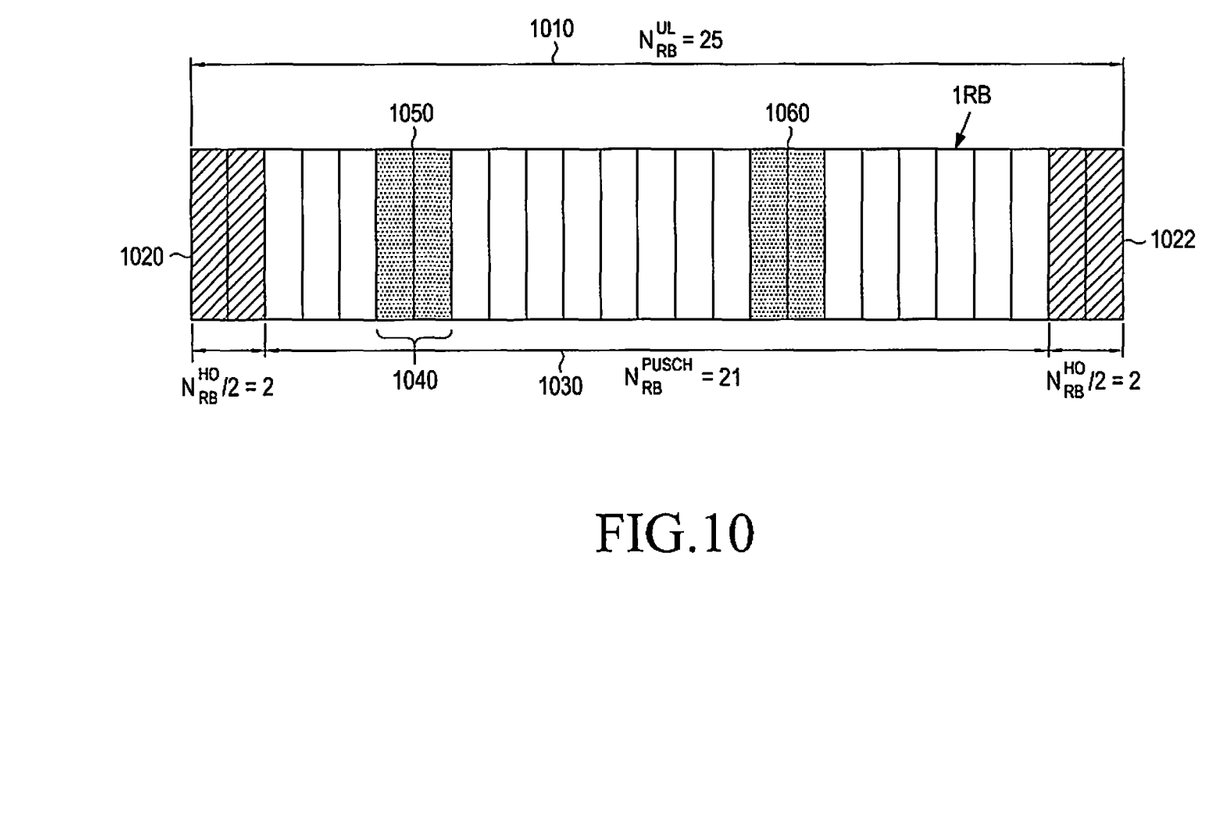
FIG. 10 is a diagram illustrating the indication of each RB for CB-PUSCH transmission in the first sub-frame slot and in the first half of the operating BW where the RBs for the transmission in the second slot are implicitly determined using frequency hopping, according to an embodiment of the present invention.

For the second method, in one example for FH, the CB-PUSCH transmission in the first slot of the sub-frame is at the RBs specified by the RA IE and the CB-PUSCH transmission in the second sub-frame slot is at an equal number of RBs whose starting point is obtained by adding $\lfloor N_{RB}^{PUSCH}/2\rfloor$ to the starting point of the RBs in the first slot, where the starting point is from 0 until $\lfloor N_{RB}^{PUSCH}/2\rfloor-1$ and $\lfloor\ \rfloor$ is the "floor" operation which rounds a number to its immediately lower integer. This is illustrated in FIG. 10, according to an embodiment of the present invention, where $N_{RB}^{UL}=25$ RBs 1010, $N_{RR}^{HO}=4$ RBs 1020 which are equally divided on each side of the BW, $N_{RR}^{PUSCH}=21$ RBs 1030, a total of 2 RBs 1040 are allocated to the CB-PUSCH transmission by the reference UE starting from RB6 1050 in the first slot and RB16 1060 in the second slot. Several other realizations of the FH operation are also possible but are not described for brevity as the particular FH realization is not material to the second method of the present invention. As in FIG. 9, it is observed that the 12 bits in the RA IE of DCI format 1F for $N_{RB}^{UL}=25$ are sufficient to address $\lfloor N_{RB}^{PUSCH}/2\rfloor=10$ RBs.

For large operating BWs, the number of RBs becomes much larger than the number of bits available for the RA IE in DCI format 1F. For example, for $N_{RR}^{UL}=50$ RBs or $N_{RR}^{UL}=100$ RBs, there are respectively 13 bits or 15 bits available for the RA IE. Combining the principles of RBG (with P=2) and FH, as they were previously described, makes the number of bits in the RA IE sufficient for $N_{RR}^{UL}=50$ RBs as the number of RBGs is 25 and only the first 12 of them need to be addressed in conjunction with the application of FH. However, this combination is clearly not sufficient for $N_{RR}^{UL}=100$ RBs and it is likely to remain so even if $N_{RR}^{HO}$ RBs are excluded from CB-PUSCH transmissions as it was previously described. Several alternative methods may apply to address this issue.

A first alternative method is to increase the RBG size by using a larger number of P, consecutive or non-consecutive, RBs. For example, for $N_{RR}^{UL}=100$ RBs and P=7, all $N_{RBG}=\lceil N_{RB}^{UL}/P\rceil=15$ RBGs can be addressed with a bitmap of 15 bits and the only modification in FIG. 6 is to change the value of P from P=2 to P=7. For P=6 and $N_{RR}^{HO}\geq 10$ RBs, it is $Na_{RR}^{PUSCH}\leq 90$ RBs and all $N_{RBG}=\lceil N_{RB}^{PUSCH}/P\rceil\leq 15$ RBGs can be addressed with a bitmap of 15 bits and the only modification in FIG. 7 is to change the value of P from P=2 to P=6 and the value of $N_{RR}^{HO}$ from $N_{RR}^{HO}=4$ to $N_{RR}^{HO}\geq 10$. For P=3, if FH is assumed, all $N_{RBG}=\lfloor\lceil N_{RB}^{PUSCH}/P\rceil/2\rfloor\leq 15$ RBGs can be addressed with a bitmap of 15 bits and the only modification in FIG. 8 is to change the RA granularity from 1 RB to P=3 RBs (1 RBG) and the value of $N_{RR}^{HO}$ from $N_{RR}^{HO}=4$ to $N_{RR}^{HO}\geq 10$. Nevertheless, in all cases the RBG size remains larger than it is appropriate to support transmission of small packets. To avoid using a larger than necessary RBG size, a UE may select only a portion of the RBG for CB-PUSCH transmission. For example, for an RBG size of P=6 RBs and CB-PUSCH transmission over 2 RBs, a UE may select either the first, the second or the third pair of RBs in an RBG indicated as available for CB-PUSCH transmission by DCI format 1F.

A second method is to address only a subset RBs of the $N_{RR\_sub}^{UL}$ RBs of the $N_{RR}^{UL}$ RBs or of the $N_{RR}^{PUSCH}$ RBs while maintaining a small RBG size. The subset of $N_{RR\_sub}^{UL}$ RBs may be defined from each end of the operating BW, and therefore the first $\lceil N_{RR\_sub}^{UL}\rceil$ RBs may be non-contiguous with the second $\lfloor N_{RB\_sub}^{UL}/2\rfloor$ RBs, or it may be defined relative to the middle of the operating BW or, in general, it may be defined relative to any reference RB of the operating BW in a manner which can be predetermined or be informed to UEs through broadcast or RRC signaling. For example, if only half of the $N_{RR}^{UL}=100$ RBs are addressed by the RA IE in DCI format 1F, combining the principles of RBG (with P=2) and FH is sufficient as for the case of $N_{RR}^{UL}=50$ RBs. As the RA IE for $N_{RR}^{UL}=100$ RBs has more bits than the RA IE for $N_{RR}^{UL}=50$ RBs, more than half of the $N_{RR}^{UL}=100$ RBs can be addressed using RBG with P=2 and FH, but nevertheless, only a subset $N_{RR\_sub}^{UL}$ RBs of the $N_{RR}^{UL}=100$ RBs can be addressed. The same applies if the $N_{RR}^{PUSCH}$ RBs, instead of the $N_{RR}^{UL}$ RBs are considered.

Figure 11:
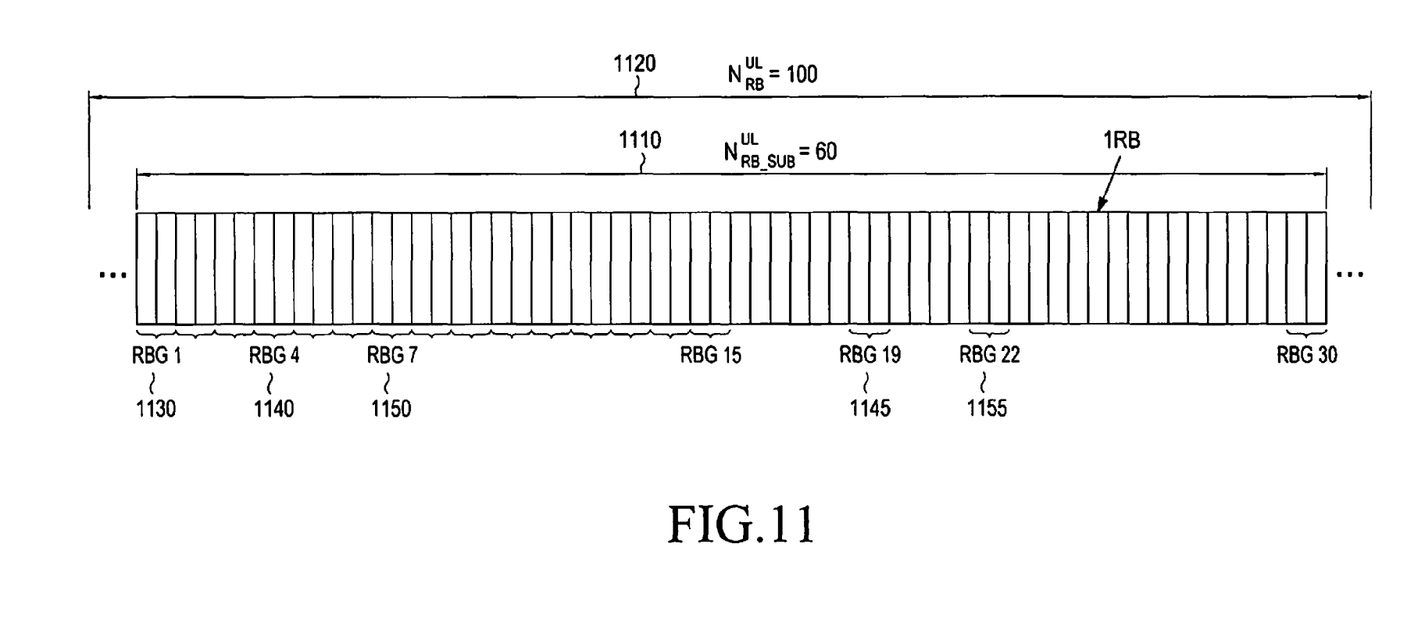
FIG. 11 is a diagram illustrating the indication of a set of RBs, which is a sub-set of the RBs in the operating BW using RBGs and FH for the CB-PUSCH transmission, according to an embodiment of the present invention.

FIG. 11 is a diagram illustrating the indication of a set of RBs, which is a sub-set of the RBs in the operating BW using RBGs and FH for the CB-PUSCH transmission, according to an embodiment of the present invention. Specifically, FIG. 11 illustrates the indication of $N_{RR\_sub}^{UL}=60$ RBs 1110 within $N_{RR}^{UL}=100$ RBs 1120 using RBGs (with P=2) 1130 and FH. For simplicity, the $N_{RR\_sub}^{UL}=60$ RBs are defined relative to the middle of the operating BW of $N_{RR}^{UL}=100$ RBs. Using the 15 bits of the RA IE of DCI format 1F as a bitmap, 15 RBGs can be addressed and, with FH, a total of 30 RBGs or 60 RBs can be indicated for CB-PUSCH transmissions. In FIG. 11, the bitmap indicates RBG4 1140 and RBG7 1150. The UE, using FH for the CB-PUSCH transmission, can select RBG4 for the CB-PUSCH transmission in the first slot and RBG19 1145 for the transmission in the second slot, or it can select RBG7 for the CB-PUSCH transmission in the first slot and RBG22 1155 for the transmission in the second slot.

A third method is to use a DCI format 1F with the same size as DCI format 0/1A for the larger operating BWs. The increase in the DCI format 1F size is acceptable for the larger operating BWs especially since the respective overhead is proportionally smaller than it is at smaller BWs where the size of DCI format 1F may be the same as the size of DCI format 1C. For example, if the size of DCI format 1F is the same as the size of DCI format 0/1A for $N_{RR}^{UL}=100$ RBs (44 bits), the respective overhead is proportionally smaller than if the size of DCI format 1F is the same as the size of DCI format 1C for $N_{RR}^{UL}=25$ RBs (28 bits) as 44/100 is smaller than 28/25. The 28 bits of the RA IE in DCI format 1F are sufficient to address all RBGs with size of P=4 RBs for $N_{RR}^{UL}=100$ RBs (as in FIG. 6 with P=4) and are likely sufficient to address all RBGs with size of P=3 RBs for $N_{RR}^{PUSCH}$ RBs (as in FIG. 9 with P=3). If FH is used, the RA IE can address all RBGs with size of P=2 RBs either for $N_{RR}^{UL}$ or for $N_{RR}^{PUSCH}$ RBs (as in FIG. 10).

If UEs are configured to decode DCI format 1F for both possible sizes corresponding to the operating BW (the size of DCI format 0/1A and the size of DCI format 1C), DCI format 1F may use either or both of these two sizes in a sub-frame. Otherwise, the size of DCI format 1F may depend on the operating BW as it was previously described.

Once the available RBs or RBGs are defined by the RA IE in DCI format 1F, a UE can randomly select the RBs or RBGs for CB-PUSCH transmission. The selection can be based on the UE's C-RNTI or CB-RNTI and may also include other parameters such as the sub-frame number, the cell-ID, and so on. In FIG. 11, based on the CB-RNTI, a first UE may select RBG4 and RBG19 for CB-PUSCH transmission in the first and second slots, respectively, and a second UE may select RBG7 and RBG22 for CB-PUSCH transmission in the first and second slots, respectively.

Alternatively, for an RBG size larger than the CB-PUSCH RB allocation, such as, for example, an RBG size of 6 RBs and CB-PUSCH transmission of 2 RBs, a first UE may select the first 2 RBs, a second UE may select the second 2 RBs, and a third UE may select the third 2 RBs in the RBG (based, for example, on the C-RNTI or on the CB-RNTI). Another possibility is to index the RBs for CB-PUSCH transmission (CB-RBs) according to the RBG index and according to the RB position within the RBG as described in Table 7 for 6 RBs per RBG. A UE requiring 2 RBs for its CB-PUSCH transmission may pseudo-randomly select 2 CB-RBs from the CB-RBs as indexed in Table 7. For example, it may select using its C-RNTI or its CB-RNTI and it may additionally include the sub-frame number within the frame.

TABLE 7

Mapping between RBs indicated by DCI Format 1F and CB-PUSCH Transmission RBs.

| RBs for CB-PUSCH | RBs in DCI Format 1F |
|---|---|
| CB-RB 1 | RBG1-RB1 |
| CB-RB 2 | RBG1-RB2 |
| CB-RB 3 | RBG1-RB3 |
| CB-RB 4 | RBG1-RB4 |
| CB-RB 5 | RBG1-RB5 |
| CB-RB 6 | RBG1-RB6 |
| CB-RB 7 | RBG2-RB1 |
| CB-RB 8 | RBG2-RB2 |
| CB-RB 9 | RBG2-RB3 |
| CB-RB 10 | RBG2-RB4 |
| CB-RB 11 | RBG2-RB5 |
| CB-RB 12 | RBG2-RB6 |
| CB-RB 13 | RBG3-RB1 |
| ... | ... |

As CB-PUSCH transmission in response to a DCI format 1F transmitted in every sub-frame can achieve user plane latency well below the target one, the transmission of DCI format 1F can be less frequent than in every sub-frame. For example, the sub-frames with DCI format 1F transmission within a frame may be predetermined or signaled through a SIB. In this manner, a UE does not need to decode DCI format 1F in every sub-frame and this can reduce UE power consumption. Alternatively, instead of using a DCI format to convey the RBs for CB-PUSCH transmissions, an SIB can be used to convey the sub-frames (if not predetermined) and the corresponding RBs (which may be the same in all sub-frames) for CB-PUSCH transmissions.

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. In a communication system in which User Equipments (UEs) receive Downlink Control Information (DCI) formats transmitted through respective Physical Downlink Control Channels (PDCCHs) from a base station over a transmission time interval, a method for a UE to transmit signals in a Physical Uplink Shared Channel (PUSCH) over a communication system operating bandwidth in response to reception of a DCI format, the method comprising the steps of:
   determining first frequency resources for transmission of the signals in the PUSCH from second frequency resources indicated by a first DCI format;
   determining values of all other parameters for the transmission of the signals in the PUSCH by other signaling exclusive of the first DCI format; and
   transmitting the signals in the PUSCH using the first frequency resources,
   wherein the size of the first DCI format is same that of a second DCI format for Scheduling PCH (Paging Channel), RACH (Random Access Channel) Response or SIB (Secondary Information Block) Transmissions, and
   wherein the all other parameters comprise the DCI Format Indication Flag, Modulation-Coding Scheme (MCS), New Data Indicator (NDI), Transmission Power Control (TPC), Cyclic Shift Indicator (CSI), Frequency Hopping (FH), CQI Request, Resource Allocation Type and Zero Padding.

2. The method of claim 1, wherein the first frequency resources are the same as the second frequency resources.

3. The method of claim 1, wherein the other signaling for determining the values of all other parameters comprise having predetermined values or having values informed to the UE by the base station either through broadcast signaling or through UE-specific signaling using higher layers.

4. The method of claim 1, wherein PDCCH resources used for the transmission of the first DCI format are common to all UEs.

5. The method of claim 1, wherein a range of the first frequency resources is smaller than the communication system operating bandwidth.

6. The method of claim 1, wherein the second frequency resources are indicated by the first DCI format using a bitmap.

7. The method if claim 1, wherein the first DCI format transmission occurs only in a subset of a set of transmission time intervals.

8. A User Equipment (UE) apparatus for transmitting signals in a Physical Uplink Shared Channel (PUSCH) over a communication system operating bandwidth of a communication system in response to reception of a Downlink Control Information (DCI) format transmitted through a Physical Downlink Control Channel (PDCCH) from a base station over a transmission time interval, the apparatus comprising:
    a receiver for receiving a first DCI format and other signaling from the base station;
    a controller for determining first frequency resources from second frequency resources indicated by the first DCI format and for determining values of all other parameters for the transmission of the signals in the PUSCH indicated by the other signaling from the base station; and
    a transmitter for transmitting the signals in the PUSCH using the first frequency resources and using the all other parameters with the corresponding values,
    wherein the size of the first DCI format is same that of a second DCI format for Scheduling PCH (Paging Channel), RACH (Random Access Channel) Response or SIB (Secondary Information Block) Transmissions,
    wherein the all other parameters comprise the DCI Format Indication Flag, Modulation-Coding Scheme (MCS), New Data Indicator (NDI), Transmission Power Control (TPC), Cyclic Shift Indicator (CSI), Frequency Hopping (FH), CQI Request, Resource Allocation Type and Zero Padding.

9. The apparatus of claim 8, wherein the first frequency resources are the same as the second frequency resources.

10. The apparatus of claim 8, wherein the other signaling is either broadcast signaling or UE-specific signaling using higher layers from the base station, and wherein additional parameters exist for which values are specified by system operation.

11. The apparatus of claim 8, wherein a range of the first frequency resources is smaller than the communication system operating bandwidth.

12. The apparatus of claim 8, wherein the first frequency resources are indicated by the first DCI format using a bitmap.

* * * * *